United States Patent Office 3,159,541
Patented Dec. 1, 1964

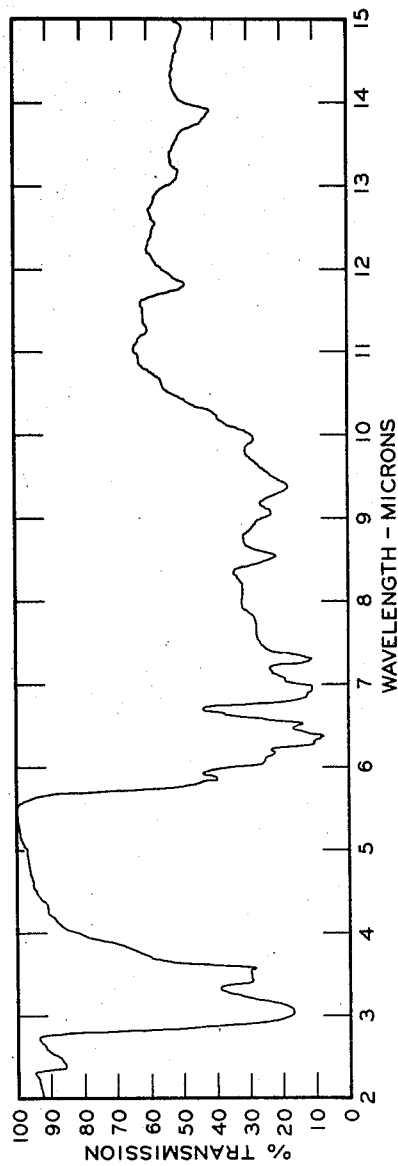

3,159,541
GEROBRIECIN
Maria S. Cataldi, Vicente Lopez, Jose Pahn, San Martin, and Oscar Luis Galmarini, San Isidro, Argentina, assignors to Olin Mathieson Chemical Corporation, New York, N.Y., a corporation of Virginia
Filed July 17, 1962, Ser. No. 211,948
7 Claims. (Cl. 167—65)

This application is a continuation-in-part of copending application Serial No. 16,083, filed March 18, 1960, now abandoned.

This invention relates to a new and useful antibiotic and more particularly, to the new antibiotic gerobriecin in its various forms.

Gerobriescin is formed by cultivation, under controlled conditions, of a hitherto undiscovered microorganism which, in conformity with the taxonomical system of Bergey's Manual of Determinative Bacteriology, is a species of the genus Streptomyces, and is herein called *Streptomyces jujuy*. This Streptomyces was obtained from a soil sample collected in La Esperanza, Province of Jujuy, Argentina, and a sample of the living organism has been deposited in, and made part of, the stock culture collection of the American Type Culture Collection, Washington, D.C., from whence it is available under accession number ATCC 13670.

THE MICROORGANISM

*Streptomyces jujuy* develops abundantly in culture media usually employed for cultivation of other organisms of the same genus. It is aerobic, gram positive, non-acid resistant, and produces abundant white branched mycelium with open spirals. It is capable of growing in a solid synthetic medium at temperatures of about 22° C. to 46° C., optimum temperature being about 24° C. The vegetative mycelium has normal branches and its ramification measures from 0.9 to 1.1 microns, and the aerial mycelia about 1.2 microns, in diameter. The conidiospores are oval and measure approximately 1.0 to 1.5 microns by 1.2 to 1.8 microns.

The physiological behavior of the culture is detailed in Table 1, and unless otherwise indicated, the table refers to the culture on the sixth day of development. The colors which are given, following the description, have been for the most part designated according to the system of the text Color Standards and Color Nomenclature, by R. Ridgway, Washington, 1912.

*Streptomyces jujuy* is classified on the basis of its cultural character in the group A–I–1 of the classification system of Waksman and Henrici (published by S. A. Waksman and H. A. Lechevalier in Actinomyces and Their Antibiotics, Baltimore, 1953), but differs noticeably from the other members of the group.

It is to be understood that the process of this invention is not limited to the use of the microorganism described in the following table, but includes inter alia variations and mutants obtained by treatment of the microorganism with ultraviolet rays, X-rays, manganese chloride, camphor, nitrogen mustards, and other mutating agents, as well as polyploids of the various mutants.

TABLE 1. CHARACTER OF *STREPTOMYCES JUJUY* CULTURES

| Cultivation Medium | Description |
| --- | --- |
| Plate of Czapek agar | Very scanty vegetative mycelium, submerged in agar.<br>Scanty aerial mycelium of white color.<br>Light buff (R) sporulation covers the colony.<br>Flat colonies with a radial border. |
| Plate of agar-glucose-asparagine (Uschinsky). | Abundant vegetative mycelium of light buff (R) color.<br>White aerial mycelium only in the border.<br>Olive buff (R) sporulation.<br>Colonies very corrugated and elevated in the center.<br>Border irregularly radiated. Back of deep olive buff (R) color.<br>No soluble pigment formed. |
| Plate of agar-calcium malate (Krensky). | Very scanty vegetative mycelium, submerged in agar.<br>White scanty aerial mycelium.<br>Light buff (R) sporulation.<br>Strongly attacks the calcium malate. |
| Plates of agar-starch | Very abundant vegetative mycelium.<br>Very abundant white, aerial mycelium.<br>Sporulation covers the colony of olive buff (R).<br>Large colonies, very corrugated, with a broad radial border.<br>Back is dark olive buff (R).<br>Hydrolysis of the starch very marked (broad zone around the colony). |
| Plates of agar nutrient | The same as with plates of agar starch. |
| Plates of blood-agar | The same as with plates of agar starch.<br>No zone of hemolysis. |
| Plates of AMD medium (Dugar agar; asparagine-meat-dextrose). | The same as with plates of agar starch. |
| Synthetic agar containing:<br>Glucose, 0.18 g.<br>Calcium gluconate, 2.5 g.<br>Ammonium phosphate, 0.4 g.<br>Potassium chloride, 0.08 g.<br>Magnesium chloride, 0.418 g.<br>Manganese chloride, 0.036 g.<br>Ferrichloride, 0.023 g.<br>Zinc sulfate, 0.045 g.<br>Cobalt chloride, 0.004 g.<br>Agar, 20 g.<br>Distilled water, q.s., 1,000 ml. | White vegetative mycelium.<br>Abundant aerial mycelium which covers the whole colony. Cottony white abundant sporulation of olive buff color.<br>Large colonies, very corrugated, with a broad radial border.<br>Back is dark olive brown (R). |
| Medium of Hickey & Tresner (J. Bact., Vol. 64, 891, 1952). | The same as with synthetic agar. Broad clarification zone around the colony. |
| Cellulose agar | No development. |
| Plate of glucose-agar | Hyaline vegetative mycelium, submerged in agar.<br>Very abundant white aerial mycelium covering the entire colony.<br>Very abundant sporulation, light mineral gray (R) color.<br>Large colony very corrugated. Dry.<br>Back deep olive color (R). |
| Plates of Emerson-agar | Hyaline vegetative mycelium.<br>Very abundant white aerial mycelium.<br>Abundant sporulation encompasses most of the entire colony. Pale olive buff color (R).<br>Flat colonies with a granulated center.<br>Back dark olive buff (R). |
| Potato wedge | Very abundant corrugated development.<br>Abundant aerial mycelium with deep olive buff color (R).<br>Spores light mineral gray (R).<br>Soluble black pigment. |
| Carrot wedge | The same as with potato wedge. No soluble pigment. |
| Gelatin | Liquified. |
| Emerson's liquid medium | Abundant development in the form of very corrugated pellicle. No soluble pigment. |
| Nitrate broth | Nitrates not reduced. |
| Litmus milk | Peptonized. |

FERMENTATION

The environment and nutritional requirements for the fermentation of *Streptomyces jujuy* are similar to those necessary for the production of antibiotics by other aerobic microorganisms. Thus, aerobiosis can be sustained on a liquid nutrient medium inoculated with a sterile culture incubated in flasks placed on shaking machines. For industrial production, metal tanks with internal aeration and agitation by means of paddles can be substituted.

Gerobriecin can also be produced by surface cultivation. The microorganism requires as nutrient elements, one or more sources of energy and carbon, organic nitrogenous substances and mineral salts. Cultivation is best effected when the initial pH of the culture medium is between 6.6 and 8.2, the optimum pH being around 7.0 to 7.5.

The utilizable sources of carbon for the production of the antibiotic are very diverse, there being included inter alia sugars (such as glucose, lactose, maltose, sucrose), dextrin, starches of different types of origin, glycerol (and other polyalcohols), inositol and animal and vegetable fats, as well as esters thereof. The sources of organic nitrogen which actively stimulate growth and favor production of gerobriescin are substances such as soybean meal, cotton meal and other vegetable meals (whole or partially or totally defatted), meat fours or animal viscera, various peptones, casein hydrolysates, soybean hydrolysates, yeast hydrolysates, lactalbumin, wheat glutins, distillers solubles, corn steeps, urea and amino acids.

Mineral salts, such as the chlorides, nitrates, sulfates, carbonates and phosphates of sodium, ammonium and calcium, should be included in appropriate concentrations. The nutritive medium should contain traces of metals such as magnesium iron, copper, manganese, zinc and cobalt.

For the adjustment of pH during the course of the fermentation, it is preferred to add buffering agents, such as calcium carbonate. If necessary, an anti-foaming agent may be added to the fermentation medium.

Under the described conditions and with the temperature of cultivation at about 25° C., maximum production of gerobriecin is obtained between 3 and 12 days (usually between about 80 to 140 hours in tanks).

The inoculum for the fermentation can be provided from suspensions of spores or of lyophilized mycelium, freeze-dried with an inert substrate. It is usually transferred through one or more passages in liquid media before the final fermentation.

EXTRACTION OF GEROBRIECIN

Gerobriescin can be recovered in good yields from the crude or centrifuged fermentation broth, at a pH between 7.0 and 9.5, where stability of gerobriescin is the best. At a more acidic pH, there is some loss, the rate of loss being accelerated with decreasing pH.

As the active product is initially obtained in an insoluble form finely dispersed in the fermentation medium, nearly all the activity is retained together with the mycelium upon filtering the fermentation broth at fermentation pH values. Gerobriecin can be recovered from the resulting filter cake by suspending and stirring thoroughly the wet cake in about 2.5 times its weight of water-saturated water immiscible solvent (e.g., n-butanol), centrifuging the suspension and processing the supernatant, as described hereinafter for the centrifuged broth. In this case, when separating the mycelium by centrifuging at adequate speed, a rich supernatant is obtained being actually an aqueous suspension of the antibiotic.

Alternatively, the active product can be obtained by extraction of the unfiltered broth with a water immiscible solvent to yield an emulsion of the browth and the extraction solvent, which can be resolved by centrifugation followed by congelation of the supernatant emulsion and subsequent centrifugation of the liquid after thawing.

If the mycelium has been separated from the broth by centrifugation, extraction of the rich aqueous supernatant with solvents produces an emulsion that can be separated very easily, by standing or by centrifugation. The activity of the broth, i.e., gerobriecin, passes into the solvent.

As water-immiscible solvents, aliphatic alcohols of at least four carbon atoms such as n-butanol, are useful. Any proportion of alcohol to broth is useful, with the optimum amount being in the range of 2:1 to 1:2.

Gerobriecin may be separated from the solvent by any conventional purification procedure. Thus, the solvent extract may be concentrated under vacuum to about 15 to 20% of the original volume and upon cooling, an amorphous dark yellow precipitate is obtained. The precipitate is filtered or centrifuged off, washed and dried to yield gerobriecin as a light, hygroscopic, intensely yellow powder. The mother liquors may be further concentrated to half their volume and reextracted by the above procedure to yield a further quantity of gerobriecin. Further purification can be effected by treating the initially obtained alcoholic extract with active carbon, which results in a product of lighter color.

Alternatively, the amorphous precipitate from the first crop may be dissolved by treating with an alkaline aqueous solution of pH 10.5 to 12. The insoluble matter is filtered off and the filtrate treated with an aqueous solution of calcium- chloride, to yield a precipitated, crystalline calcium-chloride gerobriecin complex of higher antibiotic activity than the original precipitate. The mother liquor of this method contains only a small amount of the original activity. The precipitate of the second crop can be purified according to the same method.

CHEMICAL PROPERTIES OF PURIFIED GEROBRIECIN

Gerobriecin is an amorphous yellow powder, soluble in pyridine and glacial acetic acid, slightly soluble in methanol and ethanol and insoluble in acetone, benzene, chloroform, carbon tetrachloride, petroleum ether and water. It is an acidic substance and is solubilized in aqueous solutions, by adding diluted sodium hydroxide solution to approximately pH 11 and can be precipitated by acidifying to pH 6–7. It is insoluble in water solutions of sodium bicarbonate, sodium carbonate as well as in 10% hydrochloric acid solutions.

Gerobriecin is an amphoteric substance which easily forms salts with both bases and acids. Thus by treating gerobriecin with an inorganic base, such as an alkali metal base (e.g., sodium hydroxide or potassium hydroxide) or an alkaline earth metal base, the corresponding metal salt is formed. By treating gerobriecin with an alkaline earth metal salt (e.g. calcium chloride or magnesium chloride) in an alcohol such as methanol, complexes are formed. By reacting gerobriecin with ammonium hydroxide or an organic nitrogen base, the corresponding ammonium or amine salt is formed.

Gerobriecin further reacts with both mineral and organic acids to form the corresponding acid salt. Thus gerobriecin can be reacted with mineral acids, such as hydrochloric acid, sulfuric acid, or phosphoric acid, to form the corresponding hydrochloride, sulfate or phosphate salt; or it may be reacted with organic acids such as acetic, citric or tartaric acid, to form the corresponding acid salts.

Gerobriecin has no well defined melting point, but decomposes to an orange-red solid at 250° C.

The ultraviolet spectrum of gerobriecin has four maxima, establishing a heptaenic chromophore group.

U.V. MAXIMA OF GEROBRIECIN

| Solvent | Wave length (m$\mu$) | | | |
|---|---|---|---|---|
| Methanol | 346 | 359 | 378 | 402 |
| Dimethyl formamide | 347 | 365 | 389 | 408 |

INFRA-RED

The infra-red spectrum of gerobriecin determined in Nujol is reproduced in the drawing. It is characterized by the presence of bands at the following wave lengths (in microns): Max., 3.00, 5.89, 6.26, 6.30, 6.46, 6.53, 6.96, 7.30, 8.55, 9.08, 9.36, 10.00, 11.30, 11.85, 12.50, 13.15 and 13.90. Min., 3.33, 5.95, 6.24, 6.32, 6.49, 6.70, 7.20, 8.00, 8.75, 9.17, 9.85, 11.00, 11.50, 12.25, 12.75, 13.40 and 14.30.

Gerobriecin upon treatment with concentrated sulfuric acid shows an intense violet color and gives only a faintly positive Molisch reaction unlike other heptaene antibiotics which give strong Molisch reactions. From its alkaline solutions, gerobriecin can be precipitated as a crystalline calcium chloride complex by the addition of a solution of calcium chloride. This property can be employed for the purification of the antibiotic.

Gerobriecin has the following elemental analysis: C, 60%; H, 8%; N, 2%; O (by difference), 30%; having a molecular formula $C_{35}H_{55}NO_{13}$, and an optical rotation of: $[\alpha]_D^{24}=+30.2°$ (c.=0.5, 5% DMF).

Gerobriecin can be differentiated from amphotericin A, amphotericin B and nystatin by paper chromatography using several solvent systems. As an example, in n-butanol ascending chromatography, gerobriecin has a mobility of $Rf=0.3-0.5$, while all the other heptaene antibiotics show a mobility of $Rf=0.1$.

ANTIMICROBIAL PROPERTIES

Gerobriecin is an antifungal antibiotic. The following table shows minimum inhibitory concentrations (M.I.C.) in mcg./ml. of gerobriecin for representative organisms.

| Microorganism: | M.I.C. (mcg./ml.) |
|---|---|
| Aspergillus niger | 30 |
| Candida albicans | 2 |
| Penicillium notatum | 40 |
| Trichophyton mentagrophytes | >100 |
| Fusarium bulbigenium | 15 |
| Ceratostomella ulmi | 4.5 |

Gerobriecin is effective in the following doses (ED 50) in mice against *C. albicans* one hour after infection:

| Route | ED 50 (mcg./mouse) | Units/Mouse |
|---|---|---|
| Subcutaneous | 17 | 613 |
| Oral | >4,000 | 120,000 |

Gerobriecin is active against normal yeast-like organisms of the intestine, as determined by the cultivation of mouse fecal matter (diluted with saline) in Sabouraud's agar. Thus upon the per os administration of either a 100, 50 or a 25 mg./kg. dose of gerobriecin, the yeast-like organisms disappear within 24 hours and the antibiotic is detected in the faeces. With a dose of either 20 mg./kg. or 10 mg/kg., repeated once a day, the yeast-like organisms disappear at the end of the second day. With either a 5 mg./kg. or a 1 mg./kg. dose, they disappear at the end of the third day in 4 out of 5 mice.

Gerobriecin is of use as a preservative (for example, in leather, paper and paints) and especially in plastics and fabrics to render them proof against mildew or other fungus attack. In the protection of fabrics, for example, the fabric may be impregnated with gerobriecin or a salt thereof as by soaking or spraying. Gerobriecin can also be used as a plant protective agent, for which purpose it can be sprayed on the plants to be treated. A suitable spray can be prepared by wet ball-milling gerobriecin or a salt thereof with water and preferably a wetting agent, such as a polyoxyalkylene sorbitan higher fatty acid (e.g., Tween 20, a polyoxyethylene sorbitan monolaurate).

The effectiveness of gerobriecin in humans has not yet been demonstrated.

The following examples illustrate methods for preparing and isolating gerobriecin:

Example 1

A suspension of growing spores of an 8-day culture of *Streptomyces jujuy* (ATCC 13670) on synthetic agar medium is cultivated in 1000 ml. Erlenmeyer flasks, each containing 25 ml. of the following sterilized culture medium:

| | G. |
|---|---|
| Defatted soybean meal | 30 |
| Glucose | 30 |
| Enzyme hydrolysate | 0.15 |
| Calcium carbonate | 2 |

Water, 1 liter.
pH adjusted to 7.2.

The flasks are incubated at 25° C. After 72 hours of static culture, 240 ml. of the same medium are added aseptically to each flask and the flasks placed for five days on a reciprocating shaker under the same conditions. The broth is harvested, then pooled and the mycelia eliminated by centrifugation; the supernatant liquid shows activity against *Candida albicans* at about 20,000 du./ml.

The centrifuged broth is concentarated under vacuum to one-tenth of the original volume. The liquid concentrate likewise shows activity (using conventional test methods) in mice against *C. albicans*.

Example 2

The growing spores of 8-day cultures of *Streptomyces jujuy* (ATCC 13670) on synthetic agar medium are cultivated in 1000 ml. of Erlenmeyer flasks, each containing 25 ml. of the following medium:

| | G. |
|---|---|
| Peanut meal | 30 |
| Penetrose | 40 |
| Protolysate | 0.15 |
| Calcium carbonate | 2 |

Water, 1 liter.
pH adjusted to 7.2.

After 3 days of static culture at 24° C., the microorganism develops on the surface of the medium. 240 ml. of the same medium are then added to each flask and the flasks placed on a reciprocating shaker for five days at 25° C. The broth is harvested and pooled and the mycelium centrifuged. The supernatant liquid has an average potency against *Candida albicans* of about 1,600 du./ml.

Example 3

A. FERMENTATION

Into a 250 cc. Erlenmeyer flask is added 50 ml. of sterilized medium having the following composition:

| | Percent |
|---|---|
| Soybean meal | 3 |
| Glucose monohydrate | 3 |
| Calcium carbonate | 0.2 |
| Protein hydrolysate | 0.015 |

Sterilization at pH 7.9 for 30 min. at 121° C.
pH after sterilization should be 7.0–7.2.

The medium is seeded with a one-week old culture of *Streptomyces jujuy* (ATCC 13670) and incubated on a shaking machine at a temperature of 25° C. After 48 hours, the culture in the flask is transferred to a 4 liter flask containing 1 liter of the same sterile medium. The culture is incubated for 48 hours, at 25° C., on a shaking machine. 1.0 liter of growing material from the final fermentation is used to seed a fermentation tank containing 25 liters of the same sterile medium. The seeded medium is fermeneted at 25° C. with constant agitation and aeration, adding corn oil as the antifoaming agent. After 100 hours, the fermentation is interrupted and the crude broth, when tested against *Candida albicans*, shows an activity of over 15,000 du./ml.

B. PREPARATION OF BROTH CONCENTRATE

Nine liters of fermenation broth is centrifugated to yield a supernatant with an activity of 100,000 du./ml. against *C. albicans*. The supernatant is extracted at pH 7.0 with 4.5 liters n-butanol. The separated butanol phase (4 liters) has an activity of 200,000 du./ml. while the broth shows an activity of only 2,500 du./ml. The butanol extract is concentrated under vacuum at 35° C. adding water for azeotropic distillation yielding a residue (0.5 liter) from which insoluble material (1 gram) is filtered off. The butanol filtrate is again distilled with water until all the butanol is eliminated and the remaining aqueous residue containing further insolubles is freeze-dried. The resulting solid is washed with petroleum ether and dried under vacuum to yield 6.5 g. of an amorphous yellow powder with 50,000 du./mg. against *C. albicans* (36.1% of the original activity).

*Example 4*

18 liters of centrifuged fermentation broth obtained by the process of Example 3 with an activity of 85,000 du./ml. against *C. albicans*, are extracted at pH 8.3 (obtained by adding dilute sodium hydroxide) with 9 liters of n-butanol. By following the process as in Example 3B, 10.9 g. of an amorphous yellow powder with an activity of 56,000 du./mg. are obtained. The mycelia from this broth are separated by centrifugation, then mixed with 1 liter of water and extracted with 5 liters of n-butanol. The n-butanol extract is processed as in Example 3B and 5.3 g. of an amorphous yellow powder with 7,500 du./mg. are obtained.

*Example 5*

37 liters of broth with mycelia obtained by the process of Example 3A is extracted with 18.5 liters of n-butanol. The mycelia are separated by centrifugation and the emulsion of butanol and water is cooled until solid, then thawed and finally centrifuged to yield 16 liters of a butanol phase which is concentrated to a volume of 3 liters. The concentrate is left at 5° C. overnight, and then filtered. A yellow amorphous precipitate is collected, which, after drying, weighs about 20 g. and shows an activity of about 7500 du./mg. against *C. albicans*. The filtrate is reconcentrated to 1.5 liters and cooled to yield more amorphous precipitate which, after filtering and drying, weighs about 13 g. and shows an activity of about 21,000 du./mg.

*Example 6*

Twenty liters of broth obtained by the process of Example 3A containing the mycelial pad, with an activity of 280,000 du./ml. against *C. albicans*, is acidified with sulfuric acid (50% in water) to pH 5.0 and filtered, after adding 5% of filter aid. The filter cake is extracted with 6 liters butanol containing 0.5 liter water. The butanolic phase is separated by centrifugation and concentrated under vacuum by adding water in such amount that one liter of water remains in the flask together with insoluble matter. Without separation, it is freeze dried to give about 18 g. of a yellow amorphous powder, with an activity of about 60,000 du./mg.

*Example 7*

Four gms. of crude gerobriecin concentrate, with an activity of 30,000 du./mg. against *C. albicans*, is suspended in 400 ml. of a solution of 200 ml. water, 80 ml. methanol and 120 ml. dimethyl-formamide. The pH is adjusted to 10.5 with 10% sodium hydroxide, resulting in the solution of the antibiotic. Insoluble portions are separated by filtration. 1 N hydrochloric acid is added to the filtrate until pH 6. A precipitate results. After standing 2 hours at 5° C., it was centrifuged off, washed with water by further centrifugation, and dried. About 1.05 g. of an amorphous yellow powder with an activity of about 48,000 du./mg. is obtained. The supernatant retains an activity of about 15,500 du./ml.

*Example 8*

PREPARATION OF A CALCIUM CHLORIDE COMPLEX OF GEROBRIECIN

Four gms. of gerobriecin concentrate with an activity of 20,000 du./mg. is suspended in 400 ml. of water. Ten percent sodium hydroxide is added until a pH of 12.0 is attained. After filtration of remaining insolubles, a clear solution is obtained to which is added, slowly and with agitation, 100 ml. of a 5% water solution of calcium chloride. The calcium-chloride gerobriecin complex begins to precipitate, and after one hour of further agitation at 5° C., is separated by centrifugation, washed with 200 ml. of water and then dried, to yield about 3.11 g. of a yellow crystalline calcium chloride complex of gerobriecin, with an activity of about 30,200 du./mg. The supernatant solution retains an activity of 3,000 du./ml.

*Example 9*

PREPARATION OF ALKALI METAL SALTS OF GEROBRIECIN

Gerobriecin, either in the crude mixture or in the form of purified crystals readily forms salts. Crystalline gerobriecin is suspended in an amount of methanol such that the concentration of the antibiotic is about 50,000 du./ml. (*Candida albicans*). Two equivalents of 1 N methanolic sodium hydroxide are added and the mixture is stirred for 15 minutes to assure complete solution of the antibiotic. The soltuion is filtered and 10 volumes of acetone are added to the filtrate. A precipitate of the sodium salt is formed thereby, which is filtered off, washed with acetone, and dried in a desiccator. The yield of the sodium salt is about 70% of the original gerobriecin based on its biological activity (in vitro).

The sodium salt has a much greater solubility in water than the original crystalline gerobriecin. It also has good solubility in methanol and dimethyl formamide.

*Example 10*

PREPARATION OF ACID ADDITION SALTS OF GEROBRIECIN

Gerobriecin is dissolved in dimethyl formamide (1 g./25 ml.), and an equivalent of concentrated hydrochloric acid is added thereto. The mixture is filtered and ten volumes of acetone are added to the neutral filtrate. The precipitate formed thereby is filtered off, washed with acetone, and dried in a vacuum desiccator. The product contains one equivalent of acid and has an in vitro bio-activity equivalent to that of the crystalline gerobriecin. It is somewhat more soluble in water and much more soluble in methanol, ethanol, isopropanol and butanol than is the crystalline gerobriecin. The acid salt, however, is insoluble in acetone, chloroform, ether, benzene, ethyl acetate and hexane.

The invention may be variously otherwise embodied within the scope of the appended claims.

What is claimed is:

1. An antifungal antibiotic selected from the group consisting of gerobriecin and salts thereof, said gerobriecin being an amphoteric substance having the following elemental analysis: C=60%; H=8%; N=2%; and O=30%, having a molecular formula $C_{35}H_{55}NO_{13}$, that possesses a specific optical rotation as measured by the D line of sodium at 24° C. of +30.2° in 5% dimethylformamide; is soluble in pyridine, glacial acetic acid and in water when adjusted to pH 11 by the addition of sodium hydroxide; slightly soluble in methanol and ethanol; insoluble in acetone, benzene, chloroform, carbon tetrachloride, and petroleum ether; decomposes at 250° C.; shows an intense violet color when treated with concentrated sulfuric acid; gives a faintly positive Molisch reaction; has an ultraviolet absorption spectrum measured in methanol with bands at the following wave lengths: 346, 359, 378 and 402 millimicrons; has an ultraviolet absorption spectrum measured in dimethylformamide with bands at the following wave lengths: 347, 365, 389 and 408 millimicrons; and has an infrared absorption spectrum when suspended in hydrocarbon oil in solid form as shown in the drawing.

2. Gerobriecin as described in claim 1.

3. An acid salt of gerobriecin as described in claim 1.
4. Gerobriecin hydrochloride as described in claim 1.
5. An alkali metal salt of gerobriecin as described in claim 1.
6. A sodium salt of gerobriecin as described in claim 1.
7. A process for preparing gerobriecin which comprises culturing *Streptomyces jujuy* in a suitable nutrient medium under aerobic conditions and recovering the antibiotic produced.

References Cited in the file of this patent

The Pfizer Handbook of Microbial Metabolites, 1961, page 129.

Pridham et al.: Applied Microbiology, January 1948, pages 53, 66.